C. REINISCH.
STRAP LOOP AND BAG FASTENING.
No. 10,887. Reissued Dec. 6, 1887.
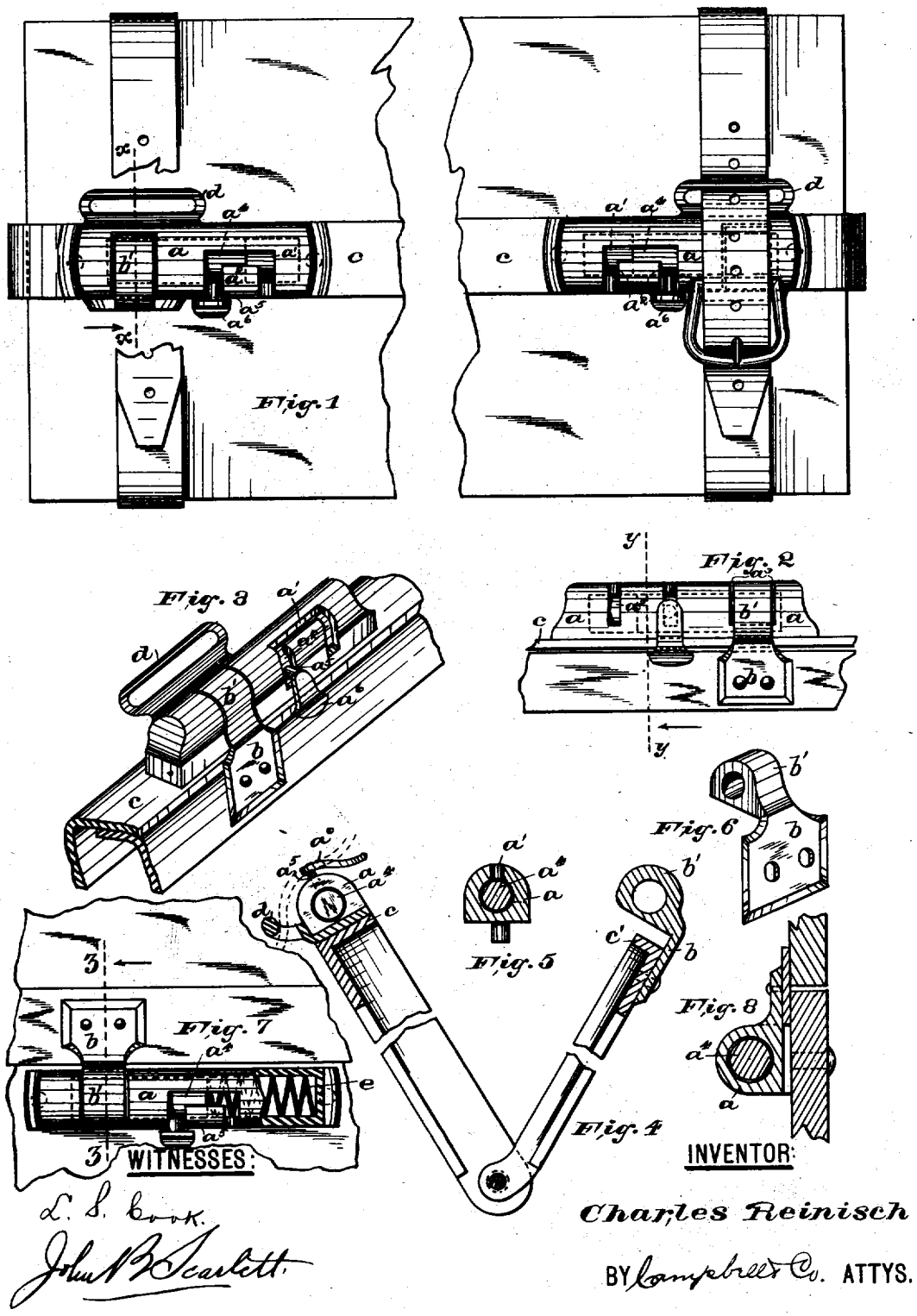
N. PETERS, Photo-Lithographer, Washington, D. C.

UNITED STATES PATENT OFFICE.

CHARLES REINISCH, OF NEWARK, NEW JERSEY.

STRAP-LOOP AND BAG-FASTENING.

SPECIFICATION forming part of Reissued Letters Patent No. 10,887, dated December 6, 1887.

Original No. 367,237, dated July 26, 1887. Application for reissue filed November 7, 1887. Serial No. 254,578.

*To all whom it may concern:*

Be it known that I, CHARLES REINISCH, a citizen of the United States, residing at Newark, in the county of Essex and State of New Jersey, have invented certain new and useful Improvements in Strap-Loops and Bag-Fastenings; and I do hereby declare the following to be a full, clear, and exact description of the invention, such as will enable others skilled in the art to which it appertains to make and use the same, reference being had to the accompanying drawings, and to letters of reference marked thereon, which form part of this specification.

The object of this invention is to provide a strong and serviceable bag-fastening and having a strap-loop combined therewith in such a manner as to co-operate with said fastening to more securely fasten the bag, and also said fastening is so constructed as to co-operate with said strap-loop to prevent the strap, when inserted through said loop, from dropping into and obstructing the mouth of the bag.

In the accompanying sheet of drawings, in which is illustrated the invention, Figure 1 is a plan of the top of a bag broken in the center and indicating the relation of said invention to the bag. Fig. 2 is an elevation of the combined fastening and loop and a portion of the frame. Fig. 3 is a perspective view of the same. Fig. 4 is a sectional view taken through the frame and centrally and transversely through the loop and fastening on line *x*, Fig. 1, the frame being open and the co-operative parts shown in their disengaged positions. Fig. 5 is a section taken through line *y*, Fig. 2, looking in the direction of the arrow. Fig. 6 is a perspective view of the catching-loop through which the sliding bolt passes. Fig. 7 is a view of the invention applied to a trunk; and Fig. 8 is a sectional view taken through line *z*, Fig. 7.

Similar letters of reference indicate corresponding parts in each of the views.

The device ordinarily used to hold the frame-sections of a bag together consists of a pivoted bifurcated catch, which is open to many objections, the bifurcated arms being liable to spread under the strain to which they are subjected, and thereby lose their holding-power; also, said pivoted catch is very apt to become loose and turn from its holding position. My improved fastening device is not open to these objections, being so constructed and arranged that a very strong and simple catch is produced.

In the views of the drawings, *a* indicates a casing, having a longitudinal slot, $a'$, and slots $a^2$ connected therewith, and is cut away at $a^3$ to receive the perforated portion $b'$ of the catching-loop *b*, which is secured to the frame-section $c'$, as shown in Figs. 1 and 2. Within the casing, which is secured to the section *c* of the frame, is arranged a sliding and rotating bolt, $a^4$, projecting from which is a pin, $a^5$, moving in the slots $a'$ $a^2$ and provided with a finger-piece, $a^6$.

In Figs. 2 and 3 the fastening device is shown in its holding position, in which the bolt passes through the perforation in the catching-loop; but when the said device is unfastened the bolt is drawn away from the said catching-loop, leaving the parts free to be separated, as in Fig. 4.

By reference to Fig. 4 the relation of the loop *d* to the casing will be seen more clearly, the said loop projecting backward and laterally from said casing away from the mouth of the bag, so that the buckle end of the strap rests upon the top of the casing, as indicated by the dotted lines in Fig. 4, and is thereby prevented from dropping into the mouth of the bag and causing much annoyance in shutting. As indicated on the left of Fig. 1, the loop is formed on the casing *a* immediately back of the opening $a^3$ and catching-loop, so that when the strap is drawn around the bag it passes up through the loop over the top of the opening $a^3$ in the casing and the inserted portion $b'$ of the catching-loop, and by thus pressing upon the said parts re-enforces the bolt in holding the parts together.

As shown in Fig. 7, a spring, *e*, is arranged within the casing to co-operate with the bolt.

Having thus described my invention, what I claim as new is—

1. A combined bag-fastening and strap-loop consisting of a casing having slots $a'$ $a^2$ therein and an opening, $a^3$, to receive a catching-loop, a strap-loop projecting from said casing back of said opening $a^3$, a sliding and rotating bolt moving in said casing across the opening $a^3$ and provided with a finger-piece projecting through said slots $a'$ $a^2$, and a catching-loop adapted to enter the opening $a^3$ and to engage with the sliding bolt, for the purposes set forth.

2. In a bag-fastening, the combination, with the frame-sections of a bag, of a casing, $a$, provided with slots $a'$ and $a^2$ therein, and an opening, $a^3$, secured to one of said frame-sections, $c$, a sliding bolt moving within said casing and provided with a finger-piece extending up through said slots $a'$ $a^2$, and a catching-loop, $b'$, having a perforation therein and adapted to project into the opening $a^3$ in the casing, said loop being secured to the opposite frame-section, for the purpose set forth.

3. A bag-fastening consisting of a casing having an opening therein to receive a catching-loop, a bolt sliding reciprocally in said casing across said loop-opening, and a catching-loop having a bolt opening or perforation therein and arranged to enter said loop opening in the casing and to be withdrawn therefrom, substantially as specified.

4. The combination, with the frame-sections $c$ and $c'$ of a bag, of a bag-fastening consisting of a casing having an opening therein to receive a catching-loop and secured to said frame-section $c$, a bolt sliding reciprocally in said casing and across said loop opening, and a catching-loop secured to said frame-section $c'$ and having a bolt opening or perforation therein, and arranged to enter and to be disengaged from said loop-opening in the casing by the closing and opening of the bag-frame sections, substantially as specified.

5. A bag-fastening consisting of a casing having an opening therein to receive a catching-loop, a bolt sliding reciprocally in said casing across said loop-opening, a catching-loop having a bolt opening or perforation therein and arranged to enter and to be disengaged from said loop-opening in the casing, and a spring arranged in said casing and operating to throw the bolt across the loop-opening and hold said bolt through the catching-loop when inserted in the loop-opening, substantially as specified.

In testimony that I claim the invention set forth above I have hereunto set my hand this 1st day of November, 1887.

CHARLES REINISCH.

Witnesses:
FREDK. F. CAMPBELL,
FREDK. C. FRAENTZEL.